United States Patent
Peschl et al.

(10) Patent No.: US 12,199,705 B2
(45) Date of Patent: Jan. 14, 2025

(54) LATTICE REDUCTION-AIDED PERTURBED ADDITIVE DEMAPPER FOR MULTIPLE-INPUT MULTIPLE-OUTPUT SIGNAL DETECTION

(71) Applicant: QUALCOMM Incorporated, San Diego, CA (US)

(72) Inventors: Markus Peschl, Amsterdam (NL); Daniel Ernest Worrall, Amsterdam (NL); Arash Behboodi, Amsterdam (NL); Roberto Bondesan, Amsterdam (NL); Pouriya Sadeghi, San Diego, CA (US); Sanaz Barghi, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 18/155,454

(22) Filed: Jan. 17, 2023

(65) Prior Publication Data
US 2023/0336220 A1 Oct. 19, 2023

Related U.S. Application Data (60) Provisional application No. 63/363,031, filed on Apr. 15, 2022.

(51) Int. Cl.
*H04B 7/0456* (2017.01)
*H04B 7/06* (2006.01)
*H04B 17/336* (2015.01)

(52) U.S. Cl.
CPC ......... *H04B 7/0456* (2013.01); *H04B 7/0697* (2013.01); *H04B 17/336* (2015.01)

(58) Field of Classification Search
CPC .. H04B 17/336; H04B 7/0413; H04B 7/0456; H04B 7/0697; H04L 25/067
See application file for complete search history.

(56) References Cited

U.S. PATENT DOCUMENTS

| | | | |
|---|---|---|---|
| 2007/0121753 A1* | 5/2007 | McNamara | H04L 1/0631 375/267 |
| 2013/0336282 A1* | 12/2013 | Nakano | H04L 25/0204 370/329 |
| 2020/0186277 A1 | 6/2020 | Rezazadehreyhani et al. | |

OTHER PUBLICATIONS

International Search Report and Written Opinion—PCT/US2023/062782—ISA/EPO—May 23, 2023.

(Continued)

*Primary Examiner* — David S Huang
(74) *Attorney, Agent, or Firm* — Patterson & Sheridan, L.L.P/Qualcomm Incorporated (57) ABSTRACT

Certain aspects of the present disclosure provide techniques and apparatus for demapping a signal to a point in a signal constellation. An example method generally includes identifying a seed point in a signal constellation from a received signal. A candidate set of codes for the signal is generated based on a seed point and an additive perturbation applied to the seed point. A point in the signal constellation corresponding to the value of the received signal is identified based on a probability distribution generated over the candidate set of codes. Generally, the identified point corresponds to a code in the candidate set of codes having a highest probability in the probability distribution. The point in the signal constellation is output as the value of the received signal.

30 Claims, 5 Drawing Sheets

(56) References Cited

OTHER PUBLICATIONS

Worrall D.E., et al., "Learning Perturbations for Soft-Output Linear MIMO Demappers", Globecom 2022, IEEE Global Communications Conference, IEEE, Dec. 4, 2022, pp. 5213-5218, XP034268426, DOI: 10.1109/GLOBECOM48099.2022.10001724, The whole document.
Kim H., et al., "Near-ML MIMO Detection Algorithm with LR-Aided Fixed-Complexity Tree Searching," IEEE Communications Letters, vol. 18, No. 12, Dec. 2014, pp. 2221-2224.
Ponnampalam V., et al., "On Generating Soft Outputs for Lattice-Reduction-Aided MIMO Detection," IEEE International Conference on Communications, Aug. 13, 2007, pp. 4144-4149.
Worrall D.E., et al., "A Perturbed Linear Demapper for MIMO Detection," Globecom, 2022, 5 Pages.
Wuebben D., R., et al., "MMSE-Based Lattice-Reduction for Near-ML Detection of MIMO Systems," in ITG Workshop on Smart Antennas (IEEE Cat. No.04EX802), 2004, pp. 106-113.

\* cited by examiner

LATTICE REDUCTION-AIDED PERTURBED ADDITIVE DEMAPPER FOR MULTIPLE-INPUT MULTIPLE-OUTPUT SIGNAL DETECTION

CROSS-REFERENCE TO RELATED APPLICATIONS

This application claims priority to and benefit of U.S. Provisional Patent Application Ser. No. 63/363,031, entitled "Lattice Reduction-Aided Perturbed Additive Demapper for Multiple-Input Multiple-Output Signal Detection," filed Apr. 15, 2022, and assigned to the assignee hereof, the entire contents of which are hereby incorporated by reference.

INTRODUCTION

Aspects of the present disclosure relate to signal detection in wireless communication systems.

Multiple-input, multiple output (MIMO) systems generally involve communications using multiple antennas at the transmitter and the receiver. Generally, by communicating using multiple transmit and receive antennas, MIMO techniques generally allow for multiple data streams to be transmitted and received simultaneously. By doing so, the capacity and throughput provided by a wireless communication system can be increased relative to single-input, single-output systems. MIMO communications may be performed using various techniques, such as spatial multiplexing, in which different signals are transmitted using different transmit antennas, beamforming (or spatial filtering), in which signals are transmitted directionally with a highest radiated power in a particular direction from a transmitting device, or the like.

Generally, MIMO signals are recovered by demapping a received signal to a point in a signal constellation, such as a quadrature amplitude modulation (QAM) constellation. A signal constellation generally includes a plurality of points in a multidimensional space, with each point representing a discrete value (e.g., of a bitstream). A received signal may be demapped to one of these points in the multidimensional space, and the bit value of the point into which the received signal is demapped is generally output for further processing.

Demapping a MIMO signal into a point in a signal constellation generally involves a probabilistic estimate of transmitted bits, which may be corrected through the use of various error correction codes, such as a low-density parity check (LDPC) code. Because of the computational expense of calculating probability estimates for transmitted bits, lower-complexity detectors are used to demap a received MIMO signal. However, these detectors may still be computationally complex, result in high power consumption, and be implemented using significant amounts of area in a processing circuit.

BRIEF SUMMARY

Certain aspects provide a processor-implemented method for demapping a signal to a point in a signal constellation. An example method generally includes identifying a seed point in a signal constellation from a received signal. A candidate set of codes for the signal is generated based on a seed point and an additive perturbation applied to the seed point. A point in the signal constellation corresponding to the value of the received signal is identified based on a probability distribution generated over the candidate set of codes. Generally, the identified point corresponds to a code in the candidate set of codes having a highest probability in the probability distribution. The point in the signal constellation is output as the value of the received signal.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the present disclosure and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide techniques and apparatus for demapping received signaling to a corresponding point in a signal constellation in a wireless communication system.

Multiple-input multiple-output (MIMO) techniques are generally used to achieve high data rates by transmitting signals from multiple antennas for reception by multiple antennas. At a receiver, various demappers may be used to decode the received signal and provide the received signal to error correction blocks for further processing. Because calculating probability estimates over transmitted bits to use as an input into error correction blocks is generally a computationally complex task, fixed lower-complexity detectors are used to attempt to simplify the task of demapping signals into a point in a signal constellation corresponding to a particular set of bit values.

In one example, linear MIMO detectors use zero-forcing (ZF) or minimum-mean squared error (MMSE) techniques to demap a received signal into a point in a signal constellation. These linear MIMO detectors, however, do not account for inter-stream interference in which one stream causes interference to other streams, and thus, are generally not able to demap received signals in situations in which the signals carried on different carriers are highly correlated. To address the inability of ZF- or MMSE-based linear MIMO detectors to account for inter-stream interference, tree-based MIMO detectors are used to iteratively search for candidate values corresponding to a received signal. These tree-based methods, however, rely on manually designed heuristics that result in a limited amount of flexibility in optimizing the MIMO detector for various channel statistics (e.g., channel signal strength properties, etc.) and various error correction procedures. Further, as the size of these signal constellations increases, and as the number of antennas via which signaling is transmitted and received increases, the trees used by tree-based MIMO detectors may become increasingly (and unfeasibly) large, which may further complicate implementation of these MIMO detectors in hardware.

Aspects of the present disclosure provide techniques that demap signals using a perturbed additive (e.g., linear) demapper that uses machine learning techniques to learn a parametric distribution of signal values centered on a seed point in a signal constellation. By using machine learning techniques to demap signals to a point in a signal constellation, aspects of the present disclosure may reduce the computational complexity of demapping signals to the corresponding points in signal constellations. Further, these machine learning techniques may allow for increased flexibility in implementing MIMO detectors, as these machine learning techniques may be used for varying sizes of signal constellations (e.g., 64QAM, 128QAM, 256QAM, etc.) and varying numbers of antennas involved in a MIMO system. Additionally, these machine learning techniques may improve the accuracy of demapping received signals to points in the signal constellation by generating more reliable log-likelihood ratios (LLRs) for subsequent error correction. Because these machine learning techniques can improve the accuracy of demapping received signals to points in the signal constellation, more reliable transmission can be achieved, with corresponding decreases in the number of retransmissions needed to successfully transmit data in a wireless communications system, reductions in power utilization from handling transmission and retransmissions, and the like.

Example Demapping of Signals to a Point in a Signal Constellation

Generally, a MIMO system may be a multiple antenna system with M transmit antennas and N≥M receive antennas. A coded bit stream may be mapped to transmit symbol vectors $x \in \Omega^M$, where $$\Omega \subset \alpha \mathbb{Z}_C - \frac{\alpha}{2}(+i)$$

is a $2^Q$-QAM complex constellation for $\alpha > 0$ and even Q, and $x_j$ represents the number of bits per symbol. $\alpha$ may be chosen such that QAM symbols are normalized to unit power per dimension (e.g., such that $\mathbb{E}[xx^H]=I_M$). Each symbol vector generally has a corresponding decoded bit value in $\{-1,1\}^{M \times Q}$, where $x_{j,b}$ is the bth bit in the jth dimension/layer of x.

In demapping a MIMO signal to a point in a signal constellation, it is generally assumed that signaling is transmitted in a flat-fading environment with a block fading channel (e.g., having constant gains per frame) that changes independently frame-to-frame. Thus, for any slot in a time-discrete complex baseband model with a noise vector (e.g., additive white Gaussian noise (AWGN)), the resulting vector y in the signal constellation may be represented by the equation y=Hx+n. H represents an N×M matrix representing a Rayleigh fading channel with independent and identically distributed complex Gaussian fading gain entries $H_{ij} \sim \mathcal{CN}(0,1/\sigma^2)$ for $\sigma > 0$. n represents a zero-mean circular-symmetric complex Gaussian noise vector with identity covariance (i.e., $\mathbb{E}[nn^H]=I_N$). In this model, the per-stream signal-to-noise ratio (SNR) may be represented by the equation $10 \log(1/\sigma^2)$, and perfect channel estimation may be assumed at the receiver.

To detect the value of a signal in a MIMO system using soft output detection, bitwise LLRs may be calculated according to the equation:

$$L(x_{j,b}) = \log \frac{p(x_{j,b} = 1 \mid y, H)}{p(x_{j,b} = -1 \mid y, H)}$$

which may be used as an input into a downstream error correction algorithm. Given the AWGN-based model discussed above, LLRs can be rewritten according to the equations $$L(x_{j,b}) = \lambda_{x_{j,b}^+} - \lambda_{x_{j,b}^-}$$

and $$\lambda_{x_{j,b}^\pm} = \log \sum_{x \in X_{j,b}^\pm} \exp\{-\|y - Hx\|^2\}$$

where $X_{j,b}^+ \subset \Omega^M$ is the subset of points x with bit $x_{j,b}=1$, and $X_{j,b}^-$ represents the subset of points x with bit $x_{j,b}=-1$. The corresponding bit of the larger of the two log likelihoods (in absolute value) is referred to as the hypothesis bit and the smaller, the counterhypothesis bit. A large part of the complexity of soft-output demappers is in computing counterhypothesis bits, because while a single hypothesis vector x* contains all the hypothesis bits, the counterhypothesis bits may be scattered across up to MQ counterhypothesis vectors.

To simplify this, an approximation of $\lambda_{x_{j,b}^\pm}$ may be calculated according to the expression:

$$\lambda_{x_{j,b}^\pm} \simeq \max_{x \in X_{j,b}^\pm} \{-\|y - Hx\|^2\}$$

which may be an approximation of a hard-output problem defined according to the equation $x^* = \arg\min_{x \in \Omega^M} \|y-Hx\|^2$.

However, even though the approximation of $\lambda_{x_{j,b}^\pm}$ may simplify the process of detecting the value of a signal in a MIMO system, calculating $$\lambda_{x_{j,b}^\pm} \simeq \max_{x \in X_{j,b}^\pm} \{-\|y - Hx\|^2\}$$

may remain an NP-complete problem for which verifying the correctness of a solution may be performed in polynomial time and a brute-force search may be used to find a solution from the universe of possible solutions.

To demap a received vector, a linear detector may demap the received vector y by left-multiplying y=Hx+n by a linear filter matrix G and then quantizing the result to a point in the signal constellation. The quantization may be defined for a finite set $\chi$ according to the equation $$\lfloor x \rfloor_x = \min_{y \in X} |x - y|$$

for a scalar variable x. For complex scalar variables, the real and imaginary components may be quantized independently; for vectors, each dimension of the vector may be quantized independently.

Mathematically, a linear detector may be represented by the equation:

$$x_{linear} = \lfloor y \rfloor_{\Omega^M}$$

where $\lfloor \bullet \rfloor_{\Omega^M}$ denotes quantization and remapping of Gy into the constellation $\Omega^M$. Generally different types of linear detectors may define G differently. For example, a ZF detector can use the Moore-Penrose pseudo-inverse of a channel matrix according to the equation $G_{ZF}=H^+=(H^H H)^{-1} H^H$, while an MMSE detector may use noise statistics of a channel and define G according to the equation $G_{MMSE}=(H^H H+I)^{-1} H^H$. In some aspects, an MMSE detector may be represented as a ZF detector over an extended channel, where $$\underline{G_{MMSE}} = \underline{H}^+, \underline{H} = \begin{bmatrix} H \\ I_{M \times M} \end{bmatrix}, \underline{y} = \begin{bmatrix} y \\ 0_M \end{bmatrix}$$

satisfies the identity function:

$$G_{MMSE} y = \underline{G_{MMSE}} \underline{y}$$

where $\underline{G_{MMSE}}$ and $\underline{y}$ represent vectors at a higher dimensionality than $G_{MMSE}$ and y.

The above equations generally produce hard outputs, or an output of a specific vector. To compute a soft output (e.g., including some measure of a likelihood that the output is the correct output), the channel model may be rewritten according to the equation:

$$y = x_j h_j + \left( \sum_{i \neq j} x_i h_i + n \right) = x_j h_j + n_j$$

where $h_1, h_2, \ldots$ represent the columns of H and $n_j$ represents a new noise vector treating layers $i \neq j$ as interference. By marginalizing the symbols $x_{i \neq j}$, a new channel for $y|x_j h_j$ may have covariance $K = I + \sum_{i \neq j} h_i h_i^H$. Thus, the problem of demapping a signal to a point in a signal constellation may be reduced into a one-dimensional problem by left-multiplying the equation by a per-channel decorrelating filter $w_j$, resulting in the equation:

$$w_j^H y = x_j w_j^H h_j + w_j^H n_j, w_j = K^{-1} h_j$$

In some aspects, $p(w_j^H y | x_j w_j^H h_j)$ may be approximated with a one-dimensional complex Gaussian with matched variance, resulting in the expression:

$$\lambda_{x_{j,b}^\pm} \simeq \log \sum_{x_j \in \Omega_b^\pm} \exp\{-(w_j^H y - x_j w_j^H h_j)^2 / \sigma_j^2\}$$

where $\sigma_j^2 = h_j^H K^{-1} h_j$ is the variance K projected on to w and $\Omega_b^\pm$ is the subset of constellation points with bit b set to $\pm 1$. The expressions presented above may implement a soft-output ZF detector. To implement a soft-output MMSE detector, $(\underline{H}, \underline{y})$ may be used in place of (H, y).

The columns of H may form the basis of a lattice according to the equation:

$$\mathcal{L} = \left\{ \sum_{j=1}^{M} x_j h_j | x_j \in \mathbb{Z}_\mathbb{C}, j = 1, \ldots, M \right\}$$

The lattice bases may be non-unique, and transformation between different bases may be performed by right-multiplication of H with a unimodular matrix U, defined according to the expression:

$$U \in GL(M, \mathbb{Z}_\mathbb{C})$$

where $GL(M, \mathbb{Z}_\mathbb{C})$, the general linear group over the complex integers, is the set of all matrices with complex integer entries and unit determinant. Each element of $GL(M, \mathbb{Z}_\mathbb{C})$, thus each unimodular matrix, has an inverse, which is also unimodular. Due to the unit determinant, right-multiplication by U is volume-preserving.

The unimodular matrices may allow for a change of basis for the lattice L and thus may allow for a reparameterization of the channel H as $H \mapsto HU^{-1}$. In many cases, MIMO detectors may not be invariant using reparameterization, and thus, some choices of U may provide higher performance than others. If the columns in H are orthogonal, it may be observed that the channel does not have inter-stream interference, and thus, linear detectors may be an optimal choice for demapping a signal to a point in a signal constellation. Thus, an optimal U may be a unimodular matrix that approximately orthogonalizes the columns of H, measured in terms of the log orthogonality defect represented by the equation:

$$\log \delta(H) = \sum_{j=1}^{M} \log \|h_j\| - \frac{1}{2} \log \det H^H H$$

The log orthogonality defect may be a non-negative quantity that decreases as the orthogonality between columns of H increases, reaching zero when the columns of H are fully orthogonal. Lattice reduction implemented by these equations may thus be used in linear detectors, as discussed above, using a channel $HU^{-1}$ and quantizing to a reduced lattice $U\mathcal{L}$ before transforming back and bounding to the original constellation $\Omega^M$. Further, it should be noted that the lattice quantization operator of a lattice $U\mathcal{L}$ may be efficiently computed using the equation $$\lfloor z \rfloor_{U\mathcal{L}} = \alpha \lfloor \alpha^{-1}(z - U\beta) \rfloor_{\mathbb{Z}_\mathbb{C}^m} + U\beta \text{ for } \beta = \frac{\alpha}{2}(+i).$$

Figure 1:
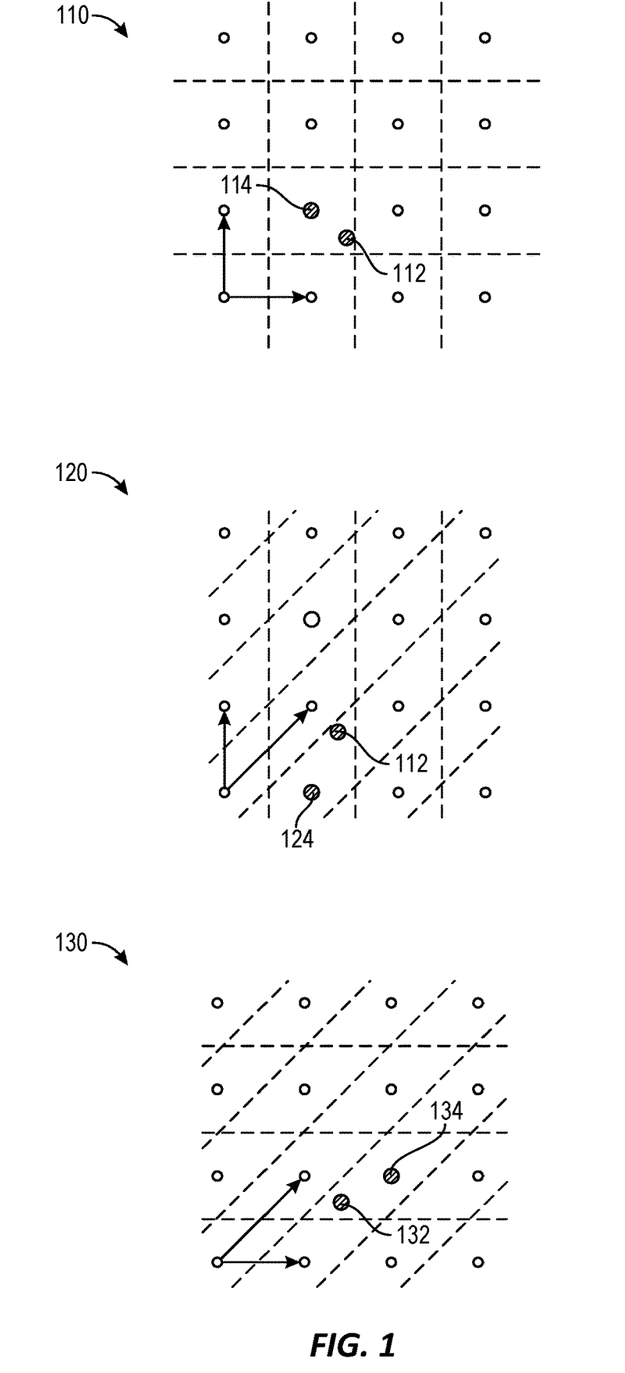
FIG. 1 depicts mappings of decoded signals to points in a signal constellation.

FIG. 1 illustrates examples of signal constellations in which received signaling in a MIMO wireless communications system are demapped to points in a signal constellation.

In a constellation 110, the points in the constellation are arranged in a grid defined by perpendicular lines. In constellations 120 and 130, the points in the constellation are arranged in a grid having lines drawn at an angle from lines parallel to an axis (the vertical axis in the constellation 120 and the horizontal axis in the constellation 130). A central point within a grid box represents a particular bit value of a signal. Points within the grid box may be mapped to the central point within that grid box.

In the constellation 110, a received signal is mapped to a seed point 112. Because the seed point 112 is within a grid box having a point 114 as its center, a MIMO demapper can map the seed point 112 to the point 114 and output the bit stream associated with the point 114 as the bits carried in the received signal. Similarly, in the constellation 120, a received signal is mapped to a seed point 122 within a grid box having a point 124 as its center, and a MIMO detector may thus output the bit value associated with the point 124 as the bits carried in the received signal. In the constellation 130, a received signal is mapped to a seed point 132 within a grid box having a point 134 as its center, and a MIMO detector may thus output the bit value associated with the point 134 as the bits carried in the received signal.

To improve the efficiency of MIMO demapping, aspects of the present disclosure provide techniques for applying perturbations to a seed point and machine learning techniques to generate a candidate set of codes (or points in the signal constellation) associated with a received signal to determine the value of the received signal. In doing so, the search space over which a received signal is demapped may be reduced from the whole of a signal constellation to a portion of the signal constellation. Within this portion of the signal constellation, there is generally a high likelihood that a point in the signal constellation corresponds to the received signal. By reducing the search space from the whole of the signal constellation to a portion of the signal constellation, the computational expense of demapping received signals to a point in the signal constellation may be reduced, which may reduce the amount of power used in processing signaling and communicating in a wireless communications network and may reduce the amount of circuitry used to implement a signal demapper.

Generally, the complexity involved in calculating $\lambda_{x_{j,b}^\pm}$ is determined by the size of the search space $|x_{j,b}^\pm|=|\Omega^M|/2=2^{QM-1}$, scaling exponentially in M and Q. That is, as the number of transmit antennas M increases, and as the number of bits Q represented by points in a signal constellation increases, the size of the search space exponentially increases. These exponential increases may become impractical as devices implement additional transmit antennas and as the size of the signal constellations increase to accommodate higher bit rates or other changes in wireless communications systems. To reduce the complexity involved in calculating LLRs over points in a signal constellation, aspects of the present disclosure replace each set of points $x_{j,b}^\pm$ with a smaller candidate set $\mathcal{B}_{j,b}^\pm$ over which LLRs are to be calculated.

A candidate set $\mathcal{B}$ may be generated using a perturbed linear model in which the output of a linear receiver Gy is augmented with a number of small perturbations δ. The perturbed outputs are quantized back to the signal constellation, such that the candidate set is represented by the equation:

$$\mathcal{B}=\{\lfloor Gy+\delta \rfloor_{\Omega^M}\}_{\delta\in\Delta\cup\{0\}}$$

In generating the candidate set, a seed point may be initially selected according to the equation Gy=[H⁺y]. The seed point Gy may be referred to as the Babai point, or estimate, of the value of a bitstream of a signal vector x carried in a received signal y. The points included in a candidate set B may be selected from the set Δ∪0 instead of Δ, where Δ corresponds to an area over which a perturbation of the seed point Gy is selected such that the seed point is always included in the candidate set $\mathcal{B}$. The set $\mathcal{B}$ may then be sifted into candidate sets for each bit j, b set to ±1 as $\mathcal{B}_{j,b}^\pm=\{x\in\mathcal{B}\,|x_{j,b}=\pm1\}$. Generally, $\mathcal{B}_{j,b}^+\cup\mathcal{B}_{j,b}^-=\mathcal{B}$ for all j and b.

Selecting the points included in the candidate set $\mathcal{B}$ based on the seed point Gy may be motivated by the hypothesis that the symbol with the highest likelihood of corresponding to the signal vector x carried in the received signal y lies close to the linear receiver output Gy and may be found within an area centered on Gy spanned by Δ. The counter-hypothesis of the value of the received signal, and the point to which the received signal can be mapped, may be found within a region around Gy.

Figure 2:
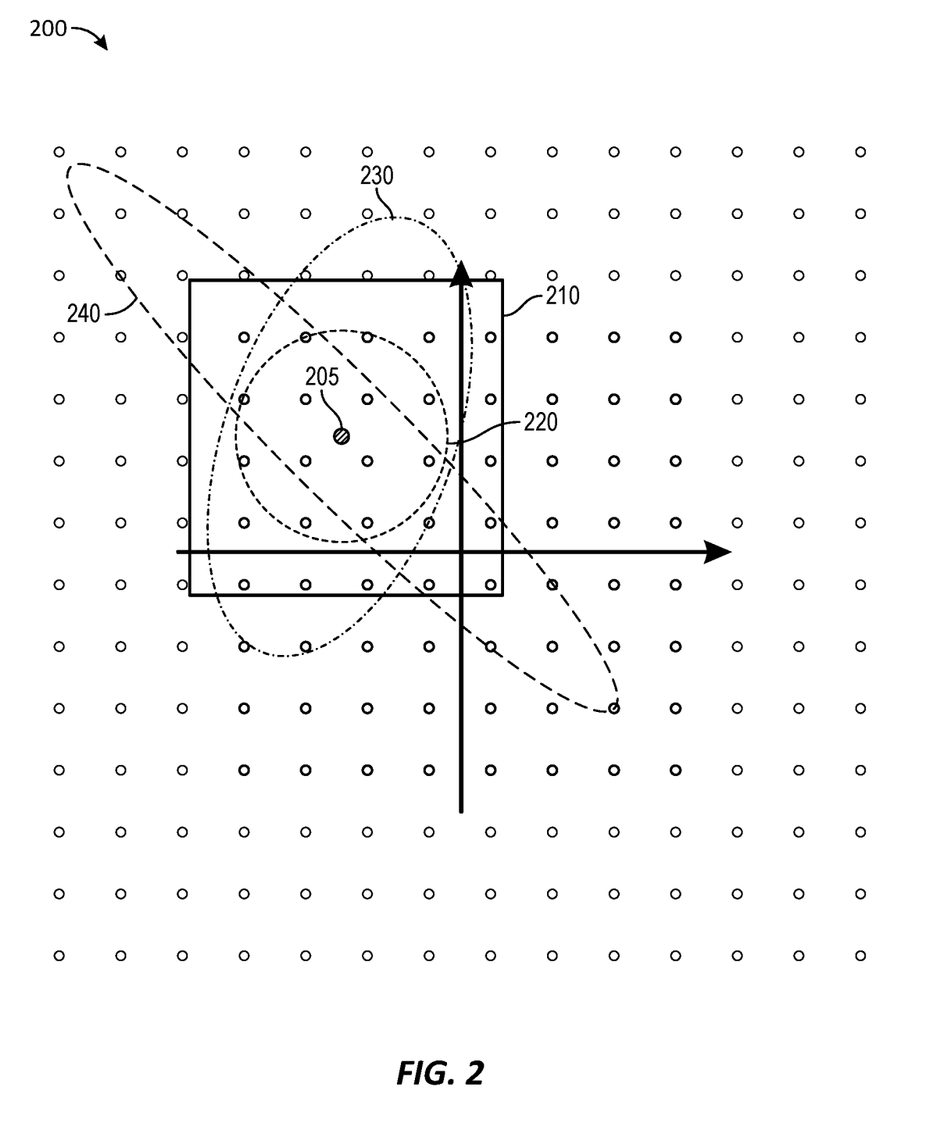
FIG. 2 depicts examples of areas in a signal constellation from which candidate codes for a received signal may be selected, according to aspects of the present disclosure.

FIG. 2 illustrates areas in a signal constellation from which candidate codes for a received signal may be selected using perturbations applied to a seed point, Gy, according to aspects of the present disclosure. As illustrated, the various perturbations may be defined, for example, as (but not limited to) a quadrilateral 210 (e.g., square, rectangle, etc.) centered on a seed point 205, a ball (or circle 220) centered on the seed point 205, an ellipse 230 centered on the seed point 205, a Gaussian distribution 240 centered on the seed point 205, and/or the like.

To generate the candidate set $\mathcal{B}$ using perturbations defined within the quadrilateral 210, each perturbation δ may be defined according to the equation:

$$\delta_{e.g.}=[0,0,s,0], \text{ where } s\in QAM$$

To generate the candidate set $\mathcal{B}$ using perturbations defined within the circle 220, the perturbations may be defined according to the equation:

$$\delta=\alpha r u^{-2M\kappa}r \text{ where } u\cdot\mathcal{U}_{(0,1)}, r\sim\mathcal{CS}_M$$

To generate the candidate set $\mathcal{B}$ using perturbations defined within the ellipse 230, the perturbations may be defined according to the equation:

$$\delta=\alpha r G(u^{-2M\kappa}r), \text{ where } u\sim\mathcal{U}_{(0,1)}, r\sim\mathcal{CS}_M$$

Finally, to generate the candidate set $\mathcal{B}$ using perturbations defined within the Gaussian distribution 240, the perturbations may be defined according to the equation:

$$\delta=\alpha r G g, \text{ where } g\sim\mathcal{CN}_{(0,1^2)}$$

In each of the equations discussed above, α is the minimum separation between QAM-constellation points; r>0 is the radius of a zero-centered complex ball; u is a real uniform random variable in interval [0,1]; M is the number of transmit antennas; κ>0 is a radial weighting factor; r is a random vector drawn from $\mathcal{CS}_M$, a uniform distribution on the complex sphere of dimension M; g is a complex Gaussian vector from a zero-centered unit-variance circular symmetric complex density; $e_i$ is a one-hot vector with a one in position i; and $\Omega_K$ is a 1D K-QAM constellation.

In an example in which samples are drawn within the circle 220, the circle 220 may be defined as a ball with radius αr. If κ=1, the distribution is uniform, with κ>1 increasing the density of samples close to 0.

In an example in which samples are drawn within the ellipse 230, samples may be drawn from a distribution within the ellipse 230 and passed through G, which makes the distribution of samples ellipsoidal. The dimensions of the samples may be correlated with G, as for ZF detectors (or other linear detectors) with H⁺, the decoded symbol vectors may take the form x=Gy−Gn, which is centered on Gy with additive noise Gn.

In an example in which samples are drawn from within the Gaussian distribution 240, a set of Gaussian samples may be defined (e.g., over a density function, with parameters of the Gaussian distribution identified based on a Bayesian optimization, as discussed in further detail below) and passed through G.

In each of the examples illustrated in FIG. 2, it should be recognized that, according to various aspects, the generation of perturbations may be parallelized, as the value of a symbol carried in a signal generally is independent of the value of a different symbol carried in the same signal. Thus, for each symbol for which a value is to be recovered, the symbols may be processed independently and in parallel to accelerate the process of recovering the values carried in a received signal.

After the candidate set $\mathcal{B}$ is generated, LLRs may be computed using max-log approximation according to the equation:

$$\lambda_{\mathcal{B}_{j,b}^{\pm}} = \max_{\mathcal{B}_{j,b}^{\pm}}\{-\|y - Hx\|^2\}$$

In some aspects, one of the sets $\mathcal{B}_{j,b}^+$ or $\mathcal{B}_{j,b}^-$ is empty, and the corresponding λ defaults to ∞. Because ∞ may not be a usable value, and because LLRs exceeding a set value may not provide optimal information for error correction and decoding, LLRs may be clipped to a maximum LLR value, $L_{max}$, such that $L(x_{j,b})=\min(\lambda_{\mathcal{B}_{j,b}^+} - \lambda_{\mathcal{B}_{j,b}^-}, L_{max})$. $L_{max}$ may be optimized for different signal conditions (e.g., signal-to-noise ratios) and may be stored in a lookup table, with an SNR or range of SNRs serving as a key for any given value of $L_{max}$.

Figure 3:
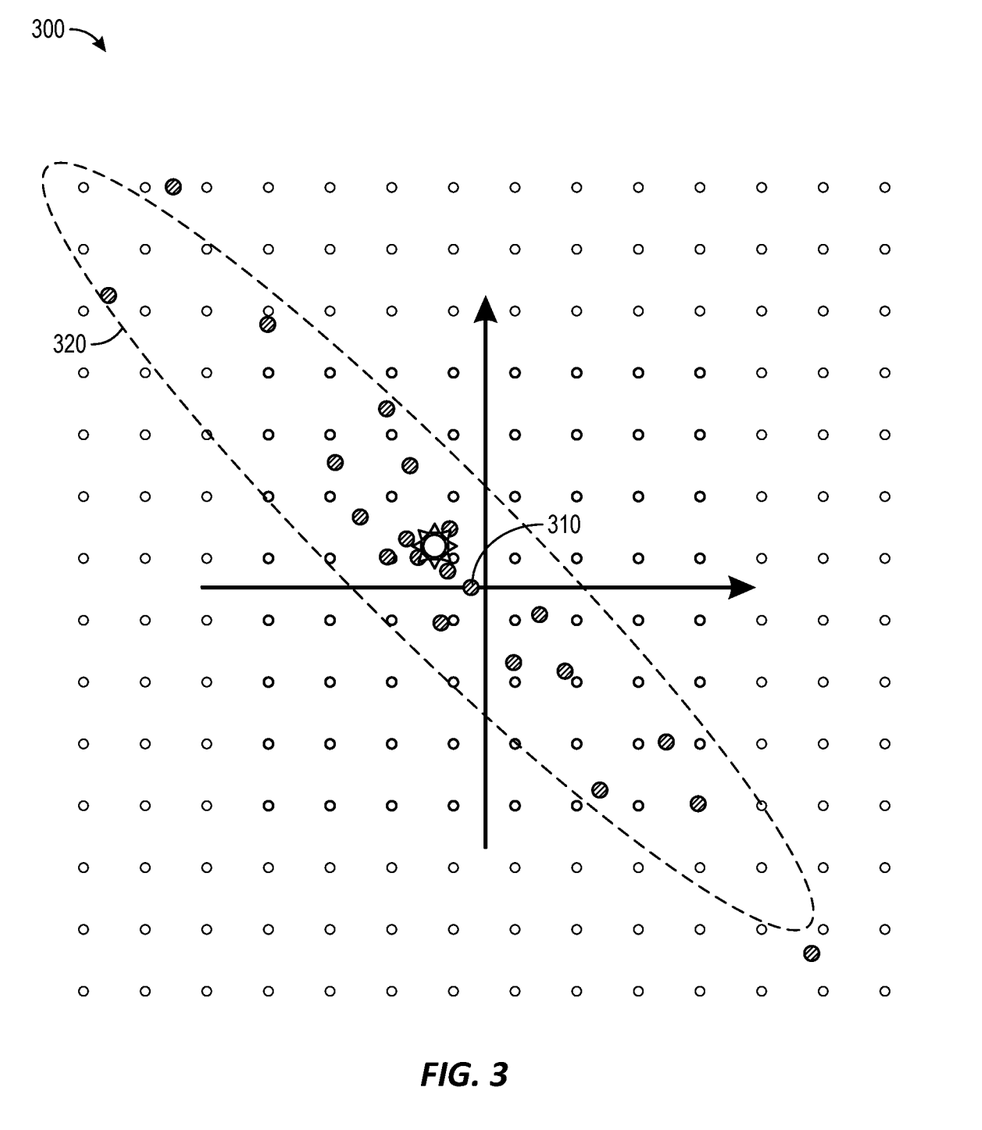
FIG. 3 depicts an example set of candidate codes in a signal constellation for a received signal, according to aspects of the present disclosure.

FIG. 3 depicts an example set of candidate codes 300 in a signal constellation for a received signal, according to aspects of the present disclosure. As illustrated, the set of candidate codes $\mathcal{B}$ may be generated from a Gaussian distribution 320 centered on a seed point 310.

In some aspects, to generate the candidate set $\mathcal{B}$, perturbations may be randomly selected within the Gaussian distribution 320. In some aspects, however, perturbations may be defined according to parameters $L_{max}$ and perturbation distribution parameters r and κ. These parameters may be optimized, for example, using a Bayesian optimization model. Generally, in a Bayesian optimization machine learning model, the parameters r and κ may be globally optimized. For each SNR (or range of SNRs), a bit error rate (BER) $L_{BER}$ may be averaged over a subset of B instances of a channel defined by the equation y=Hx+n for a given value of an input θ. A Gaussian process may be fit with a Matérn covariance kernel to a training data set of input-output pairs $\{(\theta_k, L_{BER,k})\}_k$. The result of this Gaussian process may be a differentiable Bayesian regression estimator of the $\theta \mapsto L_{BER}$,k mapping, which can be used to choose the next value of θ in the optimization process.

In some aspects, the Bayesian optimization may be executed as an "offline" process to find optimal values (constrained by noise and other optimization constraints) of θ for each SNR. During use, θ may be looked up from a lookup table given the SNR of the channel over which a received signal is carried. θ may generally be chosen to optimize end-to-end performance and may allow for the performance of MIMO demappers to be more efficient than performing a grid search over the signal constellation, which may become computationally infeasible.

In some aspects, it should be noted that generating the candidate set of points $\mathcal{B}$ for a given received signal using perturbation need not involve the use of lattice reduction. Lattice reduction generally allows for the identification of a hypothesis of sufficient quality (e.g., the identification of a seed point that may be assumed to be close to the actual point in the signal constellation corresponding to the received signal) around which perturbations can be defined. When lattice reduction is used, the channel H may be replaced with $HU^{-1}$, and the quantization operation may be similarly defined. Because lattice reduction is generally a computationally complex problem, an approximation algorithm, such as an algorithm involving a number of Gram-Schmidt iterations (e.g., defined as $\lceil\sqrt{M}\rceil$, where M, as described above, corresponds to a number of transmit antennas) may be used to compute U. Generally, U may be computed once for each H, and the expense of computing U and performing lattice reduction may be amortized over multiple channels where H is assumed to be constant.

In some aspects, where lattice reduction is used in processing a received signal, lattice reduction can be performed for each subcarrier. However, lattice reduction can be shared across multiple subcarriers. For example, lattice reduction performed for one subcarrier may be applied to other subcarriers within a coherence bandwidth defined for the wireless communications system in which signaling is received. This coherence bandwidth may include, for example, frequencies over which a channel is constant (e.g., in which signals may have comparable or correlated fading characteristics).

Example Operations for Demapping Signals to a Point in a Signal Constellation

Figure 4:
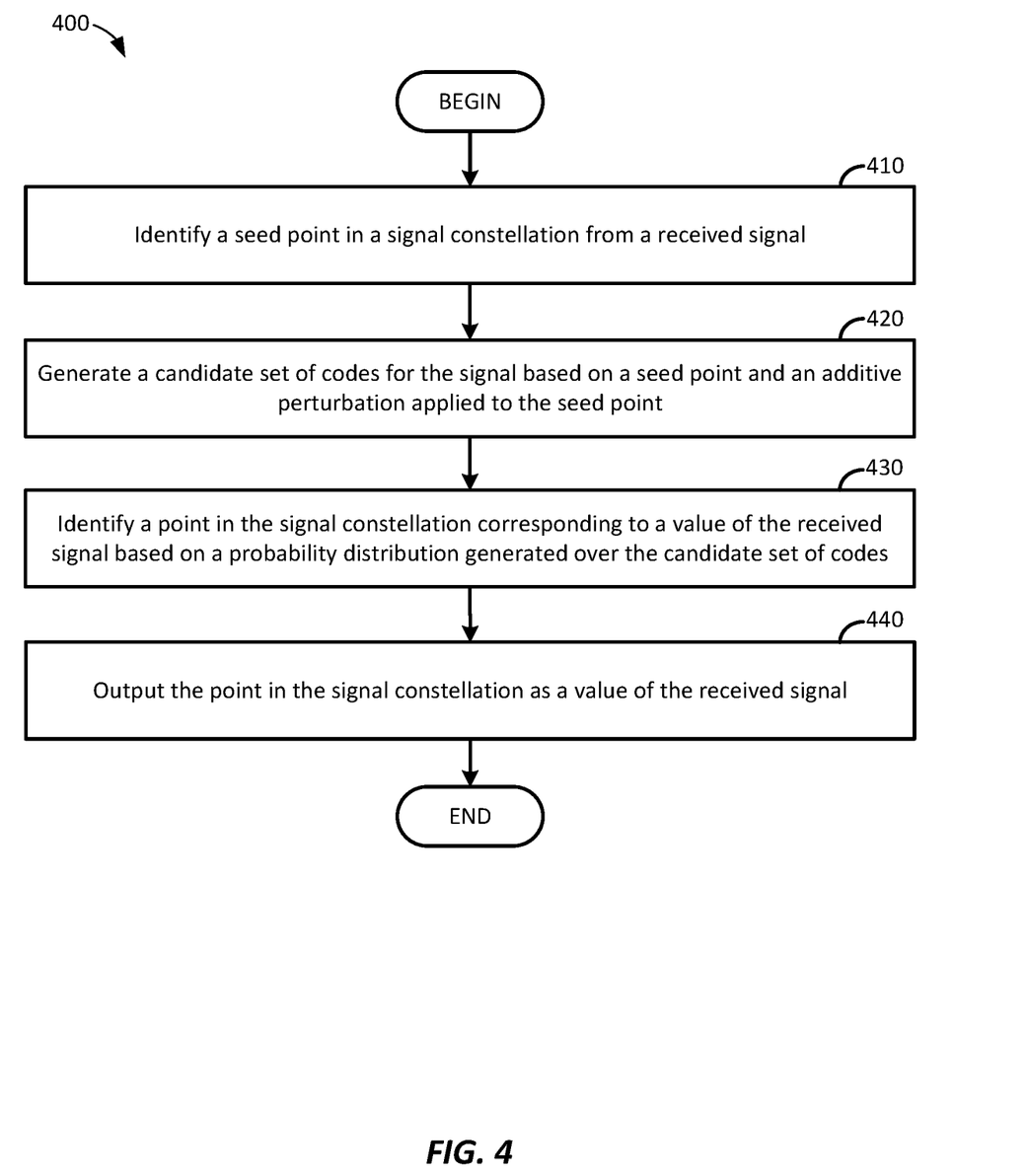
FIG. 4 depicts example operations for demapping a received signal into a point in a signal constellation based on a lattice reduction-aided perturbed additive demapper, according to aspects of the present disclosure.

FIG. 4 illustrates example operations 400 demapping a received signal into a point in a signal constellation based on a lattice reduction-aided perturbed additive demapper, according to aspects of the present disclosure. The operations 400 may be performed, for example, by a receiving wireless device in a wireless communication system, such as (but not limited to) a user equipment (UE) in (but not limited to) a 5G cellular telecommunications system, a wireless station in a Wi-Fi (802.11) network, or the like.

As illustrated, the operations 400 include, at block 410, identifying a seed point in a signal constellation from a received signal. In some aspects, the seed point may be identified by demapping the received signal based on a linear transformation. This linear transformation may include a matrix reparameterization and a demapping based on the reparametrized matrix. The matrix may be reparametrized based on lattice reduction using a unimodular matrix, and the received signal may be demapped based on the reparametrized matrix and a symbol vector representing the received signal. The unimodular matrix (e.g., a square matrix where each entry has a value of −1, 0, or 1) may be a matrix in a set of matrices with complex integer entries and a unit determinant in a general linear group over a set of complex integer entries. In reparameterizing the matrix representing the channel, the matrix may be transformed from H to $HU^{-1}$.

At block 420, the operations 400 proceed with generating a candidate set of codes for the signal based on a seed point and an additive perturbation applied to the seed point.

In some aspects, the candidate set of codes may be generated by selecting points in a signal constellation comprising points within a quadrilateral defined with the seed point as a center point of the quadrilateral. In some aspects, the candidate set of codes may be generated by selecting points in a signal constellation as a uniform distribution within a circle defined based on a radius from the seed point. In some aspects, the candidate set of codes may be generated by selecting points in the signal constellation as a uniform distribution within an ellipse defined with the seed point as a center point of the ellipse.

In some aspects, generating the candidate set of codes may include selecting points in the signal constellation based on a Gaussian distribution calculated from a density function. The Gaussian distribution may also use the seed point as a center point of the Gaussian distribution, and the selected points in the signal constellation may be identified relative to the seed point based on parameters identified based on a Bayesian optimization. These parameters may include, for example, perturbation distribution parameters r and K, where r corresponds to a radius from the seed point from which codes in the candidate set are to be selected and K corresponds to a sample density. These parameters may be learned based on mappings between inputs θ and averaged bit error rates over a number of inputs for a given signal-to-noise ratio.

At block 430, the operations 400 proceed with identifying a point in the signal constellation corresponding to a value of the received signal based on a probability distribution generated over the candidate set of codes. The identified point generally corresponds to a code in the candidate set of codes having a highest probability in the probability distribution.

In some aspects, to identify the point in the signal constellation corresponding to the value of the received signal, a log likelihood ratio may be computed over the candidate set of codes. The log likelihood ratio may be calculated based on clipping to a maximum LLR value associated with a signal-to-noise ratio of the received signal, which may be retrieved from a lookup table keyed by signal-to-noise ratio values or may be identified based on a Bayesian optimization.

At block 440, the operations 400 proceed with outputting the point in the signal constellation as the value of the received signal. The point may be output with one or more points from one or more other signals in a forward error correction component of a wireless transceiver. The forward error correction component may use, for example, low density parity check (LDPC) algorithms or other error correcting algorithms to correct for bit errors in a bitstream generated from the signal and the one or more other signals.

In some aspects, the operations 400 may include performing communications in a wireless communications network based on the point in the signal constellation. The wireless communications network may include a cellular wireless communications network (e.g., a 5G network), an IEEE 802.11 wireless communications network, or other wireless communications network in which data may be transmitted and received over a wireless channel. The communications may include voice and/or data communications carried in the wireless communications network.

Figure 5:
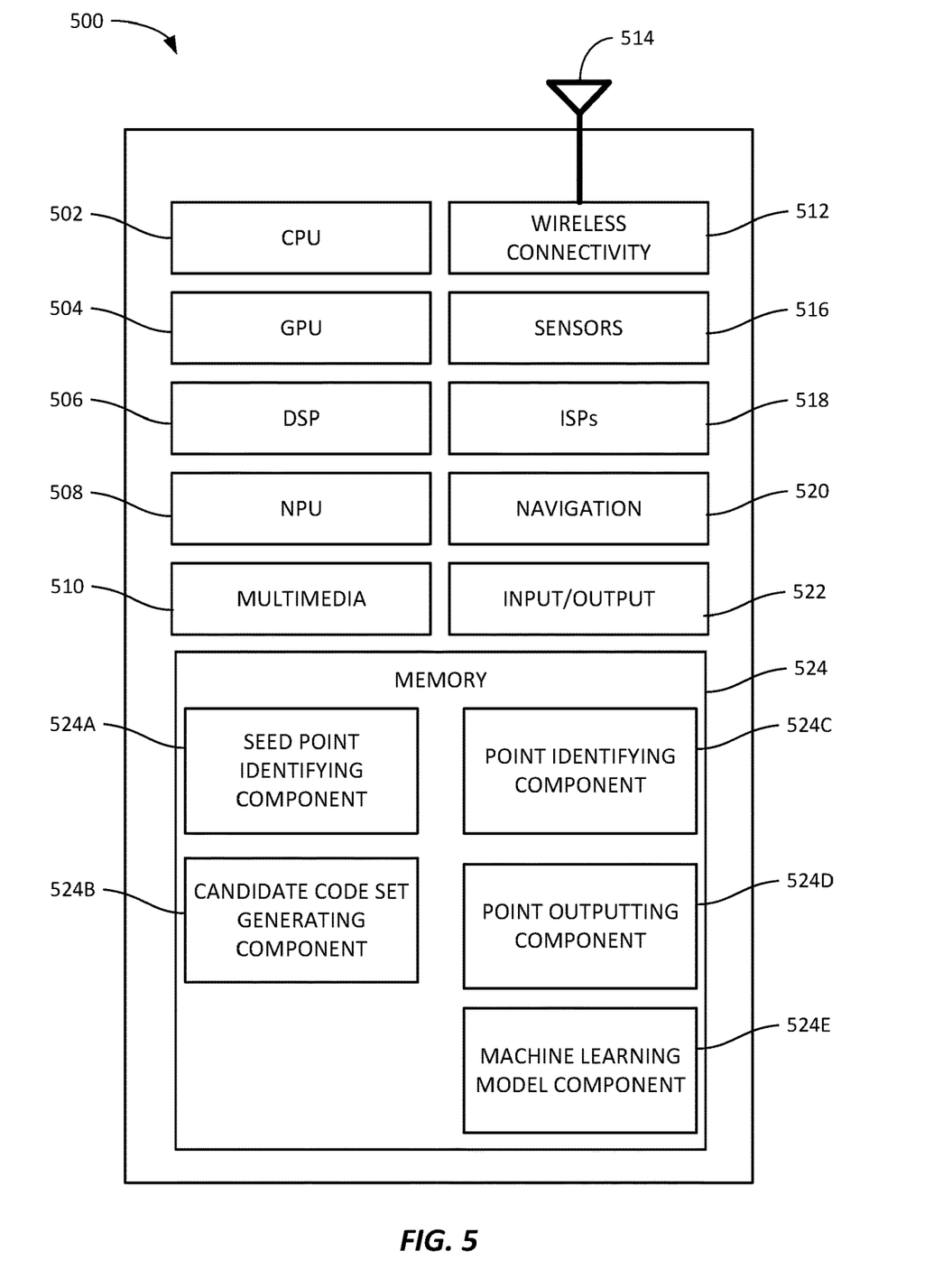
FIG. 5 depicts an example implementation of a processing system on which a received signal is demapped into a point in a signal constellation, according to aspects of the present disclosure.

Example Processing Systems for Demapping Signals to a Point in a Signal Constellation FIG. 5 depicts an example processing system 500 for demapping received signals to a point in a signal constellation, such as described herein for example with respect to FIG. 4.

The processing system 500 includes a central processing unit (CPU) 502, which in some examples may be a multi-core CPU. Instructions executed at the CPU 502 may be loaded, for example, from a program memory associated with the CPU 502 or may be loaded from a memory 524.

The processing system 500 also includes additional processing components tailored to specific functions, such as a graphics processing unit (GPU) 504, a digital signal processor (DSP) 506, a neural processing unit (NPU) 508, a multimedia processing unit 510, a wireless connectivity component 512.

An NPU, such as the NPU 508, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 508, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, the NPU 508 is a part of one or more of the CPU 502, GPU 504, and/or DSP 506.

In some examples, the wireless connectivity component 512 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. The wireless connectivity component 512 is further coupled to one or more antennas 514.

The processing system 500 may also include one or more sensor processing units 516 associated with any manner of sensor, one or more image signal processors (ISPs) 518 associated with any manner of image sensor, and/or a navigation component 520, which may include satellite-based positioning system components (e.g., GPS or GLONASS) as well as inertial positioning system components.

The processing system 500 may also include one or more input and/or output devices 522, such as screens, touch-sensitive surfaces (including touch-sensitive displays), physical buttons, speakers, microphones, and the like.

In some examples, one or more of the processors of the processing system 500 may be based on an ARM or RISC-V instruction set.

The processing system 500 also includes memory 524, which is representative of one or more static and/or dynamic memories, such as a dynamic random access memory (DRAM), a flash-based static memory, and the like. In this example, the memory 524 includes computer-executable components, which may be executed by one or more of the aforementioned processors of the processing system 500.

In particular, in this example, the memory 524 includes a seed point identifying component 524A, a candidate set generating component 524B, a point identifying component 524C, a point outputting component 524D, and a machine learning model 524E. The depicted components, and others not depicted, may be configured to perform various aspects of the methods described herein.

Generally, the processing system 500 and/or components thereof may be configured to perform the methods described herein.

Notably, in other aspects of the present disclosure, elements of the processing system 500 may be omitted, such as where the processing system 500 is a server computer or the like. For example, the multimedia processing unit 510, wireless connectivity component 512, sensor processing units 516, ISPs 518, and/or navigation component 520 may be omitted in other aspects. Further, elements of the processing system 500 may be distributed, such as training a model and using the model to generate inferences.

EXAMPLE CLAUSES

Implementation details of various aspects are described in the following numbered clauses.

Clause 1: A method performed by a wireless device in a wireless communication network, comprising: identifying a seed point in a signal constellation from a received signal; generating a candidate set of codes for the received signal based on a seed point and an additive perturbation applied to the seed point; identifying a point in the signal constellation corresponding to a value of the received signal based on a probability distribution generated over the candidate set of codes, wherein the identified point corresponds to a code in the candidate set of codes having a highest probability in the probability distribution; and outputting the point in the signal constellation as the value of the received signal.

Clause 2: The method of Clause 1, wherein identifying the seed point comprises demapping the received signal based on a linear transformation.

Clause 3: The method of Clause 2, wherein demapping the received signal comprises: reparameterizing a matrix representing a channel over which the received signal is received based on lattice reduction using a unimodular matrix; and demapping the received signal based on the reparameterized matrix and a symbol vector representing the received signal.

Clause 4: The method of any of Clauses 1 through 3, wherein generating the candidate set of codes comprises selecting points in the signal constellation comprising points within a quadrilateral defined with the seed point as a center point of the quadrilateral.

Clause 5: The method of any of Clauses 1 through 4, wherein generating the candidate set of codes comprises selecting points in the signal constellation as a uniform distribution within a circle defined based on a radius from the seed point.

Clause 6: The method of any of Clauses 1 through 5, wherein generating the candidate set of codes comprises selecting points in the signal constellation as a uniform distribution within an ellipse defined with the seed point as a center point of the ellipse.

Clause 7: The method of any of Clauses 1 through 6, wherein generating the candidate set of codes comprises selecting points in the signal constellation based on a Gaussian distribution calculated from a density function.

Clause 8: The method of Clause 7, wherein parameters of the Gaussian distribution comprise parameters identified based on a Bayesian optimization.

Clause 9: The method of any of Clauses 1 through 8, wherein identifying the point in the signal constellation corresponding to the value of the received signal comprises computing a log likelihood ratio over the candidate set of codes.

Clause 10: The method of Clause 9, wherein the log likelihood ratio is calculated based on clipping to a maximum value associated with a signal-to-noise ratio of the received signal.

Clause 11: The method of Clause 10, further comprising retrieving the maximum value from a lookup table keyed by signal-to-noise ratio values.

Clause 12: The method of Clause 10 or 11, further comprising identifying the maximum value based on a Bayesian optimization.

Clause 13: The method of any of Clauses 1 through 12, further comprising performing communications in the wireless communications network based on the point in the signal constellation.

Clause 14: The method of any of Clauses 1 through 13, wherein the wireless communications network is a 5G network.

Clause 15: The method of Clause 13 or 14, wherein the communications include voice communications in the wireless communications network.

Clause 16: The method of any of Clauses 13 through 15, wherein the communications include data communications in the wireless communications network.

Clause 17: The method of any of Clauses 1 through 16, wherein outputting the point comprises outputting the point for processing with one or more other points from one or more other signals in a forward error correction component of a wireless transceiver.

Clause 18: A processing system, comprising: a memory comprising computer-executable instructions; and one or more processors configured to execute the computer-executable instructions and cause the processing system to perform a method in accordance with any of Clauses 1-17.

Clause 19: A processing system, comprising means for performing a method in accordance with any of Clauses 1-17.

Clause 20: A non-transitory computer-readable medium comprising computer-executable instructions that, when executed by one or more processors of a processing system, cause the processing system to perform a method in accordance with any of Clauses 1-17.

Clause 21: A computer program product embodied on a computer-readable storage medium comprising code for performing a method in accordance with any of Clauses 1-17.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a wireless device in a wireless communication network, comprising:
    identifying a seed point in a signal constellation from a received signal;
    generating a candidate set of codes for the received signal based on the seed point and an additive perturbation applied to the seed point;
    identifying a point in the signal constellation corresponding to a value of the received signal based on a probability distribution generated over the candidate set of codes, wherein the identified point corresponds to a code in the candidate set of codes having a highest probability in the probability distribution; and
    outputting the identified point in the signal constellation as the value of the received signal.

2. The method of claim 1, wherein identifying the seed point comprises demapping the received signal based on a linear transformation.

3. The method of claim 2, wherein demapping the received signal comprises:
    reparameterizing a matrix representing a channel over which the received signal is received based on lattice reduction using a unimodular matrix; and
    demapping the received signal based on the reparameterized matrix and a symbol vector representing the received signal.

4. The method of claim 1, wherein generating the candidate set of codes comprises selecting points in the signal constellation comprising points within a quadrilateral defined with the seed point as a center point of the quadrilateral.

5. The method of claim 1, wherein generating the candidate set of codes comprises selecting points in the signal constellation as a uniform distribution within a circle defined based on a radius from the seed point.

6. The method of claim 1, wherein generating the candidate set of codes comprises selecting points in the signal constellation as a uniform distribution within an ellipse defined with the seed point as a center point of the ellipse.

7. The method of claim 1, wherein generating the candidate set of codes comprises selecting points in the signal constellation based on a Gaussian distribution calculated from a density function.

8. The method of claim 7, wherein parameters of the Gaussian distribution comprise parameters identified based on a Bayesian optimization.

9. The method of claim 1, wherein identifying the point in the signal constellation corresponding to the value of the received signal comprises computing a log likelihood ratio over the candidate set of codes.

10. The method of claim 9, wherein the log likelihood ratio is calculated based on clipping to a maximum value associated with a signal-to-noise ratio of the received signal.

11. The method of claim 10, further comprising retrieving the maximum value from a lookup table keyed by signal-to-noise ratio values.

12. The method of claim 10, further comprising identifying the maximum value based on a Bayesian optimization.

13. The method of claim 1, further comprising performing communications in the wireless communications network based on the identified point in the signal constellation.

14. The method of claim 1, wherein the wireless communications network is a 5G network.

15. The method of claim 1, wherein outputting the identified point comprises outputting the identified point for processing with one or more other points from one or more other signals in a forward error correction component of a wireless transceiver.

16. A processing system, comprising:
a memory having computer-executable instructions stored thereon; and
a processor configured to execute the computer-executable instructions in order to cause the processing system to:
identify a seed point in a signal constellation from a received signal;
generate a candidate set of codes for the received signal based on the seed point and an additive perturbation applied to the seed point;
identify a point in the signal constellation corresponding to a value of the received signal based on a probability distribution generated over the candidate set of codes, wherein the identified point corresponds to a code in the candidate set of codes having a highest probability in the probability distribution; and
output the identified point in the signal constellation as the value of the received signal.

17. The processing system of claim 16, wherein in order to identify the seed point, the processor is configured to cause the processing system to demap the received signal based on a linear transformation.

18. The processing system of claim 17, wherein in order to demap the received signal, the processor is configured to cause the processing system to:
reparameterize a matrix representing a channel over which the received signal is received based on lattice reduction using a unimodular matrix; and
demap the received signal based on the reparameterized matrix and a symbol vector representing the received signal.

19. The processing system of claim 16, wherein in order to generate the candidate set of codes, the processor is configured to cause the processing system to select points in the signal constellation comprising points within a quadrilateral defined with the seed point as a center point of the quadrilateral.

20. The processing system of claim 16, wherein in order to generate the candidate set of codes, the processor is configured to cause the processing system to select points in the signal constellation as a uniform distribution within a circle defined based on a radius from the seed point.

21. The processing system of claim 16, wherein in order to generate the candidate set of codes, the processor is configured to cause the processing system to select points in the signal constellation as a uniform distribution within an ellipse defined with the seed point as a center point of the ellipse.

22. The processing system of claim 16, wherein in order to generate the candidate set of codes, the processor is configured to cause the processing system to select points in the signal constellation based on a Gaussian distribution calculated from a density function.

23. The processing system of claim 22, wherein parameters of the Gaussian distribution comprise parameters identified based on a Bayesian optimization.

24. The processing system of claim 16, wherein in order to identify the point in the signal constellation corresponding to the value of the received signal, the processor is configured to cause the processing system to compute a log likelihood ratio over the candidate set of codes.

25. The processing system of claim 24 wherein the log likelihood ratio is calculated based on clipping to a maximum value associated with a signal-to-noise ratio of the received signal.

26. The processing system of claim 25, wherein the processor is further configured to cause the processing system to retrieve the maximum value from a lookup table keyed by signal-to-noise ratio values.

27. The processing system of claim 16, wherein the processor is further configured to cause the processing system to perform communications in a wireless communications network based on the identified point in the signal constellation.

28. The processing system of claim 16, wherein in order to output the identified point, the processor is configured to cause the processing system to output the identified point for processing with one or more other points from one or more other signals in a forward error correction component of a wireless transceiver.

29. A processing system for wireless communications, comprising:
means for identifying a seed point in a signal constellation from a received signal;
means for generating a candidate set of codes for the received signal based on the seed point and an additive perturbation applied to the seed point;
means for identifying a point in the signal constellation corresponding to a value of the received signal based on a probability distribution generated over the candidate set of codes, wherein the identified point corresponds to a code in the candidate set of codes having a highest probability in the probability distribution; and
means for outputting the identified point in the signal constellation as the value of the received signal.

30. A non-transitory computer-readable medium comprising computer-executable instructions that, when executed by one or more processors of a processing system, cause the processing system to perform an operation comprising:
identifying a seed point in a signal constellation from a received signal;
generating a candidate set of codes for the received signal based on the seed point and an additive perturbation applied to the seed point;
identifying a point in the signal constellation corresponding to a value of the received signal based on a probability distribution generated over the candidate set of codes, wherein the identified point corresponds to a code in the candidate set of codes having a highest
probability in the probability distribution; and outputting the identified point in the signal constellation
as the value of the received signal.

\* \* \* \* \*